United States Patent [19]

Zentgraf et al.

[11] Patent Number: 5,102,441
[45] Date of Patent: Apr. 7, 1992

[54] METHOD OF MAKING A LANGBEINITE SLURRY AS A BINDER FOR MGO-CONTAINING FERTILIZERS AND FERTILIZERS THEREFROM

[75] Inventors: Helmut Zentgraf, Burghaum/Steinbach; Ulrich Neitzel, Kassel, both of Fed. Rep. of Germany

[73] Assignee: Kali and Salz AG, Kassel, Fed. Rep. of Germany

[21] Appl. No.: 551,551

[22] Filed: Jul. 11, 1990

Related U.S. Application Data

[63] Continuation-in-part of Ser. No. 179,040, Apr. 8, 1988, abandoned, which is a continuation-in-part of Ser. No. 889,809, Jul. 24, 1986, abandoned, which is a continuation-in-part of Ser. No. 647,407, Sep. 5, 1984, abandoned.

[30] Foreign Application Priority Data

Sep. 7, 1983 [DE] Fed. Rep. of Germany ....... 3332250

[51] Int. Cl.$^5$ .............................................. C05D 1/02
[52] U.S. Cl. ...................... 71/63; 71/64.02; 71/64.06
[58] Field of Search ................. 71/1, 61, 63, 64.02, 71/64.06, 31

[56] References Cited

U.S. PATENT DOCUMENTS 3,630,713 12/1971 Adams et al. ................... 71/63 X
3,926,609 12/1975 Effmert et al. .................. 71/63 X Primary Examiner—Ferris Lander
Attorney, Agent, or Firm—Michael J. Striker

[57] ABSTRACT

A process of making a granulated MgO-containing potassium salt fertilizer containing potassium sulfate, and having a high abrasion resistance and high compression resistance, includes preparing a langbeinite slurry binder without an evaporation of a magnesium chloride-containing solution with heating at a temperature of from 95° to 110° C. with a density of from 1.6 to 1.7 g/cm$^3$, mixing the potassium salt and recyclable fines with the langbeinite at a temperature of from 75° to 100° C., granulating in a granulating drum, screening to form the fertilizer and recyclable fines; and recovery and recycle of the fines. The liquid langbeinite binder can be made by mixing a mixture of magnesium sulfate and/or kieserite with potassium sulfate, schoenite and/or leonite the potassium sulfate and the magnesium sulfate being present in a mole ratio of from 1:1.5 through 1:3 and heating the mixture to a temperature of 95° to 110° C. with a turbidity density of 1.6 to 1.7 g/cm$^3$.

9 Claims, 2 Drawing Sheets

METHOD OF MAKING A LANGBEINITE SLURRY AS A BINDER FOR MGO-CONTAINING FERTILIZERS AND FERTILIZERS THEREFROM

This application is a continuation-in-part of Ser. No. 179,040, filed Apr. 8, 1988, which is a continuation-in-part of Ser. No. 889,809, filed 07/24/86, which is a continuation-in-part of Ser. No. 647,407, filed Sept. 5, 1984, all now abandoned.

BACKGROUND OF THE INVENTION

The present invention relates to an improved method of making a MgO-Containing potassium salt fertilizer using a langbeinite slurry binder and, more particularly, to an improved method of making the aqueous langbeinite slurry binder used in the granulation of MgO-containing fertilizers.

Methods of making a MgO-Containing potassium salt fertilizer using langbeinite ($K_2SO_4.2MgSO_4$) as a binder are known. For example, U.S. Pat. No. 3,926,609 to Effmert et al describes a method of making a high abrasion resistant and compression resistant fertilizer by mixing dry, hot potassium chloride or sulfate or a mixture thereof, optionally in combination with kieserite, with hot moist langbeinite at a final mixing temperature of from about 75° to 110° C. and a total moisture content of 3 to 10 % and cooling the mixture with agitation to under 60° C. Fines are recycled so that a grain size from 1 to 4 mm is obtained.

It is the use of langbeinite as a binder which produces fertilizer granules which are particularly pressure and abrasion resistant so that they can be handled practically without generation of dust, which can otherwise be considerable leading to many problems as described in German Patent 23 16 701.

Langbeinite is used as a fertilizer binder conventionally in solid form and is obtained by evaporation of the liquor from $K_2SO_4$ production after filtration and washing to free it from $MgCl_2$. In more detail, the solid langbeinite used previously may be produced as shown in the process in FIG. 1. Leonite (after filtration) and potassium chloride are reacted in water to form potassium sulfate in step B. The liquor formed in the potassium sulfate reaction in step B is reacted in step A with kieserite ($MgSO_4.H_2O$) to form a potassium magnesia liquor and the leonite which is used in step B. The potassium magnesia liquor from step A is then evaporated and the concentrate is filtered to produce the solid langbeinite (after washing).

The production of langbeinite by crystallization from an aqueous solution of 2 mol magnesium sulfate and 1 mol potassium sulfate at a temperature above 85° C. has been described in "Gmelins Handbuch der Organischen Chemie", 8.Auflage, Systen-Nr.22, Kalium-Anhangband (1942), page 101f. However, even at such a high temperature it has been shown that it is difficult to separate the product from concentrated mother liquor.

The problem with using langbeinite in solid form as a fertilizer binder is that it "ages" so that it becomes unsuitable for use as a binder for granulation of MgO-containing fertilizers after some time.

SUMMARY OF THE INVENTION

It is an object of the present invention to provide a process for making a langbeinite binder for fertilizers, which is not in solid form and which does not have the undesirable property of aging.

It is also an object of the present invention to provide a process for making a MgO-containing potassium salt fertilizer which uses a langbeinite binder which is simpler than current methods and does not require separate isolation of a solid langbeinite.

According to the present invention the MgO-containing potassium salt fertilizer is made using a langbeinite slurry as a binder.

This langbeinite slurry binder has the advantage that "aging" is no longer a problem for storage and later use.

In more detail, the langbeinite slurry of the invention is made at atmospheric pressure by mixing solid potassium sulfate and solid magnesium sulfate and/or materials containing them so that the mole ratio of potassium sulfate to magnesium sulfate is from about 1:1.5 through 1:3. A turbid slurry results with a density of about 1.65 g/cm.

For example kieserite ($MgSO_4.H_2O$) may be used as the magnesium sulfate-containing material, while either potassium sulfate itself can be used as a potassium-containing material, schoenite, leonite or the fine material which is generated when granulating MgO-containing fertilizers, since it contains a high constituent of potassium sulfate which cannot be used for other purposes.

Prior to use as a binder for making fertilizer the langbeinite slurry is heated to a temperature of from 95° to 110° C. at atmospheric pressure and a turbidity density of 1.6 to 1.7 g/cm. However just before use as a binder it is advantageously cooled to 75°-100° C., preferably 80° to 90° C.

Supersaturation in the liquid phase in the langbeinite slurry is not essential, but it is felt that it would be helpful.

The MgO-containing potassium salt fertilizers according to the invention are made by mixing the potassium salt, for example potassium sulfate or chloride, and optionally kieserite, and recycled fines produced later in the process and heating to 85° C., with the langbeinite binder and finally granulating in a granulating drum. The resulting "green pellets" can be cooled in a fluid bed apparatus so as to harden them. Then the resulting product is screened to form pellets with 1 to 4 mm size and the fines are returned to the beginning of the process.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE INVENTION

Figure 1:
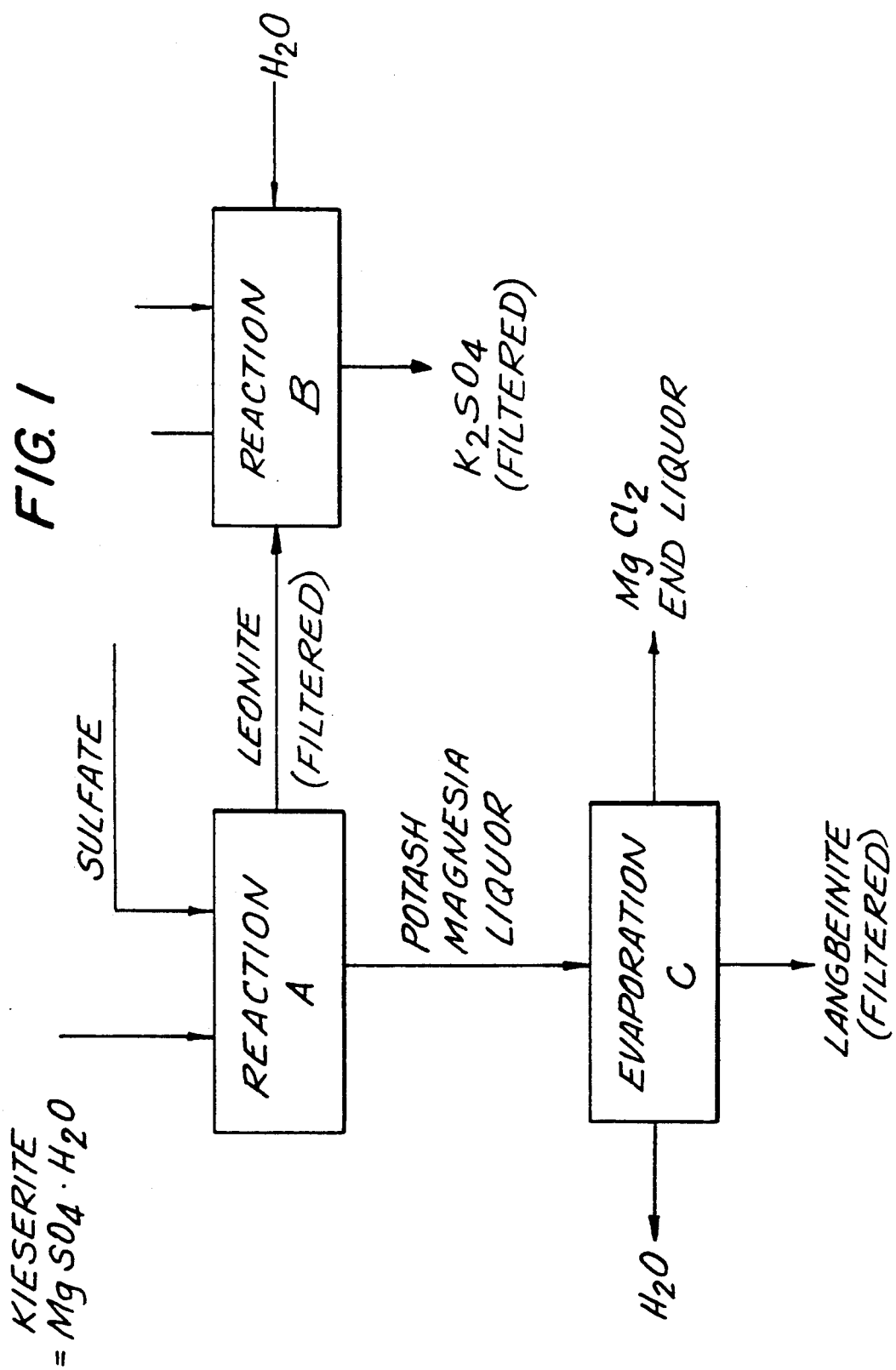
FIG. 1 is a flow chart of a process for making a solid langbeinite as a binder according to the conventional method.
Figure 2:
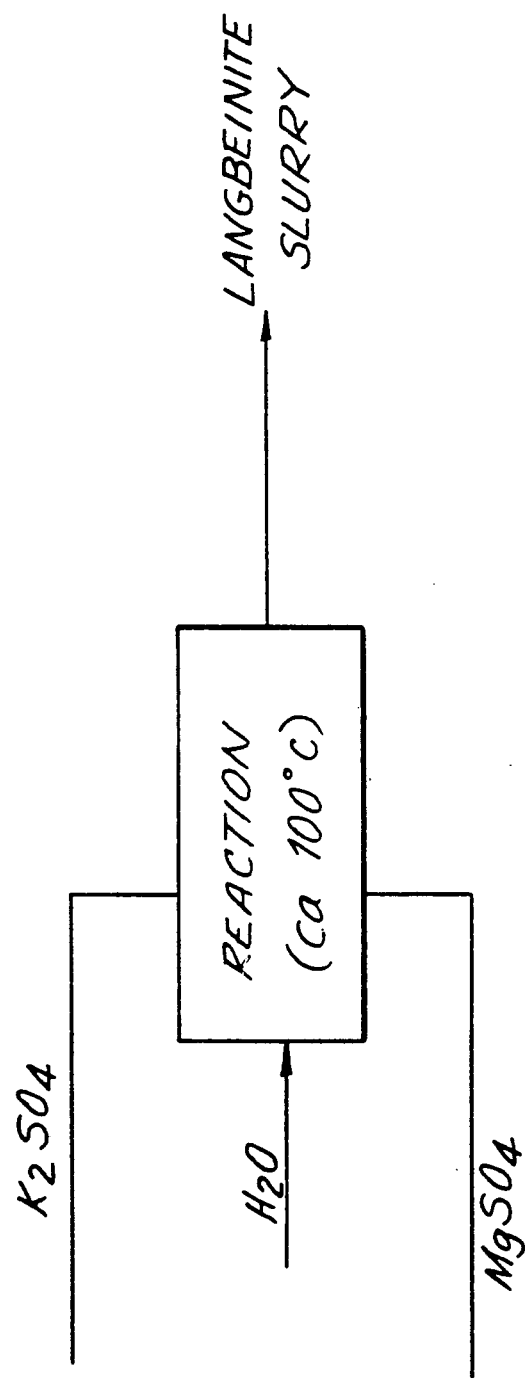
FIG. 2 is another flow chart of a process for making a langbeinite slurry as a binder according to the present invention.

The langbeinite binder is made according to the invention without evaporation or filtration according to the simpler method of FIG. 2. FIG. 2 shows the langbeinite slurry being made in a single step by mixing the solid magnesium sulfate containing material and the solid potassium sulfate containing material in water at about 100° C.

Several examples of fertilizers based on a method using this slurry are possible.

EXAMPLE 1

15 tons (metric) of potassium sulfate (containing 50% $K_2O$ average size 0.25 mm) and 24 t of finely ground Kieserite (82% $MgSO_4$; 90% of the material below 0.1 mm) are mixed with 13.4 t of water heated to 100° C. and agitated intensively for one hour. The resulting slurry of langbeinite ($K_2SO_4 \cdot 2MgSO_4$) has a slurry density of 1.65 g/cm$^3$.

13 tons of potassium sulfate (50% $K_2O$), 6 tons of Kieserite (average size 0.25 mm) and 16 tons of recycled screened fines (below 1 mm), produced later in the process, are heated to 85° C. and mixed with 7 t of langbeinite slurry (1.65 g/cm$^3$) and granulated in a granulating drum.

The resulting pellets are cooled to 35° C. in a fluid bed apparatus so that a hardening effect takes place. The mixture is screened at 1 and 4 mm, the oversized material is ground and returned to the screening operation and the fines below 1 mm are returned to the beginning of the process.

The product (30% $K_2O$ and 10% MgO) has an abrasion resistance of 1.5% and compressive resistance of 5 newton/grain.

EXAMPLE 2

19.4 tons of fines from a granulation process according to example 1 (containing 30% $K_2O$ and 10% MgO in form of potassium sulfate and magnesium sulfate) and finely milled Kieserite (90% below 0.1 mm) are mixed with 8 t of water, heated to 98° C. and agitated intensively for 1.5 hours. The resulting langbeinite slurry is used in the granulating process according to example 1.

While the invention has been illustrated and described as embodied in a process for making a MgO-containing potassium salt fertilizer using a langbeinite binder, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A process of making a granulated MgO-containing potassium salt fertilizer containing potassium sulfate, and having a high abrasion resistance and high compression resistance, comprising the steps of:
   a. preparing a langbeinite binder without an evaporation of a magnesium chloride-containing solution by mixing a material containing solid potassium sulfate and a material containing solid magnesium sulfate in water in such a ratio that said potassium sulfate and said magnesium sulfate are present in a mole ratio of from 1:1.5 to 1:3 and heating said binder at a temperature of from 95° to 110° C. with a density of from 1.6 to 1.7 g/cm$^3$;
   b. mixing said potassium salt and recyclable fines with said langbeinite binder at a temperature of from 75° C. to 100° C.;
   c. granulating in a granulating drum to form pellets;
   d. screening said pellets to form said fertilizer and said recyclable fines; and
   e. feeding said fines back to step b.

2. A process according to claim 1, wherein said material containing solid potassium sulfate is selected from the group consisting of potassium sulfate, schoenite and leonite and said material containing solid magnesium sulfate is selected from the group consisting of magnesium sulfate and kieserite.

3. A process according to claim 2, wherein said material containing solid potassium sulfate is substantially solid potassium sulfate and said material containing solid magnesium sulfate is substantially solid magnesium sulfate.

4. process according to claim 1, further comprising prior to said mixing admixing kieserite with said potassium sulfate and said recyclable fines.

5. A process according to claim 1, further comprising prior to said mixing cooling said langbeinite binder to a temperature of 80° to 90° C.

6. A process according to claim 1, further comprising cooling said pellets prior to said screening in a fluid bed apparatus for hardening.

7. A method of making a langbeinite binder for a MgO-containing potassium salt fertilizer comprising the steps of: stirring a mixture of a material containing solid potassium sulfate and a material containing solid magnesium sulfate in water, said potassium sulfate material and said magnesium sulfate material being present in such a ratio that said potassium sulfate and said magnesium sulfate are present in a mole ratio of from 1:1.5 through 1:3 and heating said mixture to a temperature of 95° to 110° C. with a turbidity density of 1.6 to 1.7 g/cm$^3$.

8. A method of making a langbeinite binder for a MgO-containing potassium salt fertilizer without evaporation of a magnesium chloride-containing solution by mixing a material containing solid potassium sulfate and a material containing solid magnesium sulfate in water in such a ratio that said potassium sulfate and said magnesium sulfate are present in a mole ratio of from 1:1.5 to 1:3 and heating said binder at a temperature of from 95° to 110° C. with a density of from 1.6 to 1.7 g/cm$^3$, said material containing solid potassium sulfate being selected from the group consisting of potassium sulfate, schoenite and leonite and said material containing solid magnesium sulfate being selected from the group consisting of magnesium sulfate and kieserite.

9. A process of making a granulated MgO-containing potassium salt fertilizer containing potassium sulfate, and having a high abrasion resistance and high compression resistance, comprising the steps of:
   a. mixing said potassium salt and recyclable fines with said langbeinite binder made according to the method of claim 8 at a temperature of from 75° C. to 100°C.;
   b. granulating in a granulating drum to form pellets;
   c. screening said pellets to form said fertilizer and said recyclable fines; and
   d. feeding said fines back to step b.

* * * * *